(12) United States Patent
Colrain et al.

(10) Patent No.: US 7,069,317 B1
(45) Date of Patent: Jun. 27, 2006

(54) SYSTEM AND METHOD FOR PROVIDING OUT-OF-BAND NOTIFICATION OF SERVICE CHANGES

(75) Inventors: Carol L. Colrain, Redwood Shores, CA (US); Harvey A. Eneman, Belmont, CA (US); Wei-Ming Hu, Palo Alto, CA (US); Sashikanth Chandrasekaran, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 830 days.

(21) Appl. No.: 10/086,949

(22) Filed: Feb. 28, 2002

Related U.S. Application Data

(60) Provisional application No. 60/272,386, filed on Feb. 28, 2001.

(51) Int. Cl.
*G06F 15/16* (2006.01)

(52) U.S. Cl. .............................. 709/224; 714/4; 714/6; 714/7

(58) Field of Classification Search .................... 714/4, 714/6, 7, 47, 48, 799; 707/202, 201; 709/224
See application file for complete search history.

(56) References Cited

U.S. PATENT DOCUMENTS

| | | | |
|---|---|---|---|
| 5,623,666 A | 4/1997 | Pike et al. | 707/200 |
| 5,659,781 A | 8/1997 | Larson | |
| 5,706,516 A | 1/1998 | Chang et al. | |
| 5,727,206 A * | 3/1998 | Fish et al. | 707/202 |
| 5,802,523 A | 9/1998 | Jasuja et al. | |
| 5,828,876 A | 10/1998 | Fish et al. | 707/1 |
| 5,872,981 A | 2/1999 | Waddington et al. | 710/200 |
| 5,890,153 A | 3/1999 | Fukuda et al. | 707/8 |
| 6,105,026 A | 8/2000 | Kruglikov et al. | |
| 6,108,654 A | 8/2000 | Chan et al. | 707/8 |
| 6,148,299 A | 11/2000 | Yoshimoto | |
| 6,314,563 B1 | 11/2001 | Agesen et al. | |
| 6,347,374 B1 | 2/2002 | Drake et al. | |
| 6,370,529 B1 | 4/2002 | Kruglikov et al. | |
| 6,401,120 B1 | 6/2002 | Gamache et al. | |
| 6,418,542 B1 | 7/2002 | Yeager | |

(Continued)

OTHER PUBLICATIONS

"Sun Cluster 2.2 Software Installation Guide," Sun Microsystems, Part No. 809-5342, Jul. 2000, Revision A.

(Continued)

*Primary Examiner*—Krisna Lim
(74) *Attorney, Agent, or Firm*—Hickman Palermo Truong & Becker, LLP

(57) ABSTRACT

A system and method for detecting a failure of a first process is disclosed. According to one aspect, a first connection is established between a first process and a second process. A monitoring mechanism monitors the status of the first process to detect whether the first process has failed. In response to determining that the first process has failed, the monitoring mechanism causes an out-of-band message to be sent to the second process.

44 Claims, 13 Drawing Sheets

U.S. PATENT DOCUMENTS

| | | |
|---|---|---|
| 6,463,457 B1 | 10/2002 | Armentrout et al. |
| 6,466,574 B1* | 10/2002 | Fujisaki et al. ............. 370/356 |
| 6,549,957 B1* | 4/2003 | Hanson et al. ................. 710/5 |
| 6,625,602 B1 | 9/2003 | Meredith et al. .............. 707/8 |
| 6,708,195 B1 | 3/2004 | Borman et al. |
| 6,718,486 B1* | 4/2004 | Roselli et al. ................ 714/41 |
| 6,772,255 B1 | 8/2004 | Daynes ....................... 710/200 |
| 6,799,173 B1 | 9/2004 | Czajkowski et al. |
| 6,804,711 B1 | 10/2004 | Dugan et al. |
| 6,807,540 B1 | 10/2004 | Huras et al. |
| 6,892,205 B1 | 5/2005 | Colrain et al. |
| 2002/0107957 A1* | 8/2002 | Zargham et al. ............ 709/224 |
| 2004/0205414 A1* | 10/2004 | Roselli et al. ................ 714/39 |
| 2005/0171945 A1 | 8/2005 | Colrain et al. |

OTHER PUBLICATIONS

"Compact ProLiant Clusters HA/F100 and HA/F200 Administrator Guide," Compaq Computer Corporation, Part No. 380362-002, Second Edition (Sep. 1999).

Gray J et al., "Transaction Processing: Concepts and Techniques," 1993, pp. 128-138, Morgan Kaufman, San Francisco, CA.

* cited by examiner

SYSTEM AND METHOD FOR PROVIDING OUT-OF-BAND NOTIFICATION OF SERVICE CHANGES

CROSS-REFERENCE TO RELATED APPLICATION

This patent application claims priority under 35 U.S.C. § 119(e) to provisional patent application Ser. No. 60/272,386, filed Feb. 28, 2001, the disclosure of which is incorporated by reference in its entirety for all purposes.

FIELD OF THE INVENTION

The present invention relates in general to systems and methods with high availability operating requirements and, in particular, to a system and method for providing out-of-band notification of changes to the database service.

BACKGROUND OF THE INVENTION

Cluster databases provide location transparency to data by allowing multiple systems to serve the same database. One specific type of cluster database is the Oracle Real Application Clusters™ product, licensed by Oracle Corporation, Redwood Shores, Calif. Sets of two or more computers are grouped into real application clusters. The clusters harness the processing power of multiple interconnected computers to provide a single robust computing environment. Within each cluster, all nodes concurrently execute transactions against the same database to synergistically extend the processing power beyond the limits of an individual component. Upon the mounting of the shared database, the real application cluster processes a stream of concurrent transactions using multiple processors on different nodes. For scale-up, each processor processes many transactions. For speed up, one transaction can be executed spanning multiple nodes.

Cluster databases provide several advantages over databases that use only single nodes. For example, cluster databases take advantage of information sharing by many nodes to enhance performance and database availability. In addition, applications can be sped up by executing across multiple nodes and can be scaled-up by adding more transactions to additional nodes. Multiple nodes also make cluster databases highly available through a redundancy of nodes executing separate database instances. Thus, if a node or database instance fails, the database instance is automatically recovered by the other instances which combine to serve the cluster database.

Cluster databases can be made more highly available through integration with high availability frameworks for each cluster. The inclusion of these components provides guaranteed service levels and ensures resilient database performance and dependable application recovery. Organizationally, individual database servers are formed into interconnected clusters of independent nodes. Each node communicates with other nodes using the interconnection. Upon an unplanned failure of an active database server node, using clusterware, an application will fail over to another node and resume operations, without transaction loss, within a guaranteed time period. Likewise, upon a planned shutdown, an application will be gracefully switched over to another node in an orderly fashion.

The guarantee of service level thresholds is particularly crucial for commercial transaction-based database applications, such as used in the transportation, finance, and electronic commerce industries. System downtime translates to lost revenue and loss of market share. Any time spent recovering from a system failure is measurable in terms of lost transactions. Consequently, high availability systems budget a set time period to help minimize lost revenue due to unplanned outages. High availability systems also budget for planned service interruptions.

Three types of service outages can occur for the database service. In the first type of software outage, such as due to a termination of a database instance or a clean shutdown of hardware, a standard error message is generated when the client attempts to next use the system. If the outage closes the TCP/IP network connections (sockets) through which the client sessions are communicating, the client application will generally receive a standard error message. The client can then attempt to restart the transaction once the service is restored. This type of outage is routine and readily resolved.

In the second type of outage, the outage panics the node, which fails to close the sockets through which the client sessions are communicating. The sessions will hang when synchronous blocking read or write system calls are pending or are issued prior to the outage until the client application times out due to the TCP keep-alive timer. TCP keep-alive timers are particularly problematic for applications that require high availability and can result in extremely long delays and service interruptions. The wait for a TCP keep-alive timer can be as long as two hours. And although TCP keep-alive timers are adjustable, tuning this parameter to low values can result in false reports of failure.

In the third type of outage, the outage panics the node and fails to close the sockets through which the client sessions are communicating while no read or write system calls are pending. The sessions block depending upon whether the Internet protocol (IP) address in use is static or mobile. For sessions using static IP addresses, the sessions will wait until for a TCP timeout, which includes a tcp_ip_interval delay for connection requests and a tcp_ip_interval delay for conversation requests. The wait can be unacceptably lengthy. For sessions using cooperative resource groups with address resolution, each session will block and wait for a timeout upon issuing a read or write system call against the IP address. The session will immediately receive an end-of-file error, unblock and select the next mobile IP address in the cooperative resource group address list.

Table 1 describes the effects of service outages on a TCP/IP-based client. In the first case, an outage with sockets closed due to software failure or node shutdown, the client receives an error and recovers. In the second case, an outage with sockets left open, the client blocks and waits from 75 seconds to two hours.

TABLE 1

Client Effects.

| State of Sockets After Outage | Connection Request | Conversation (SQL or PL/SQL Request) | Blocked in I/O Read or Write |
|---|---|---|---|
| Socket Closed (software | Client receives error | Client receives error | Client receives error |

TABLE 1-continued

Client Effects.

| State of Sockets After Outage | Connection Request | Conversation (SQL or PL/SQL Request) | Blocked in I/O Read or Write |
|---|---|---|---|
| failure or node shutdown) Socket left open (node panics) | Tcp_ip_abort_cinterval (75 seconds) | Tcp_ip_abort_interval (10 minutes) | Tcp_keepalive_interval (2 hours) |

Therefore, there is a clear need for a mechanism that can reduce the latency that is typically incurred when a socket has been left open between a first and a second process after one of the two processes has failed.

SUMMARY OF THE INVENTION

A system and method for detecting a failure of a first process is disclosed. According to one aspect, a first connection is established between a first process and a second process. A monitoring mechanism monitors the status of the first process to detect whether the first process has failed. In response to determining that the first process has failed, the monitoring mechanism causes an out-of-band message to be sent to the second process. According to one feature, the operation of establishing a first connection between the first process and a second process includes the operation of establishing a first connection between an application server and a database instance; the operation of monitoring the status of the first process includes the operation of monitoring the status of the database instance; and the operation of notifying the second process that the first process has failed includes the operation of causing an out-of-band break to be sent to the application server.

DETAILED DESCRIPTION

Figure 1:
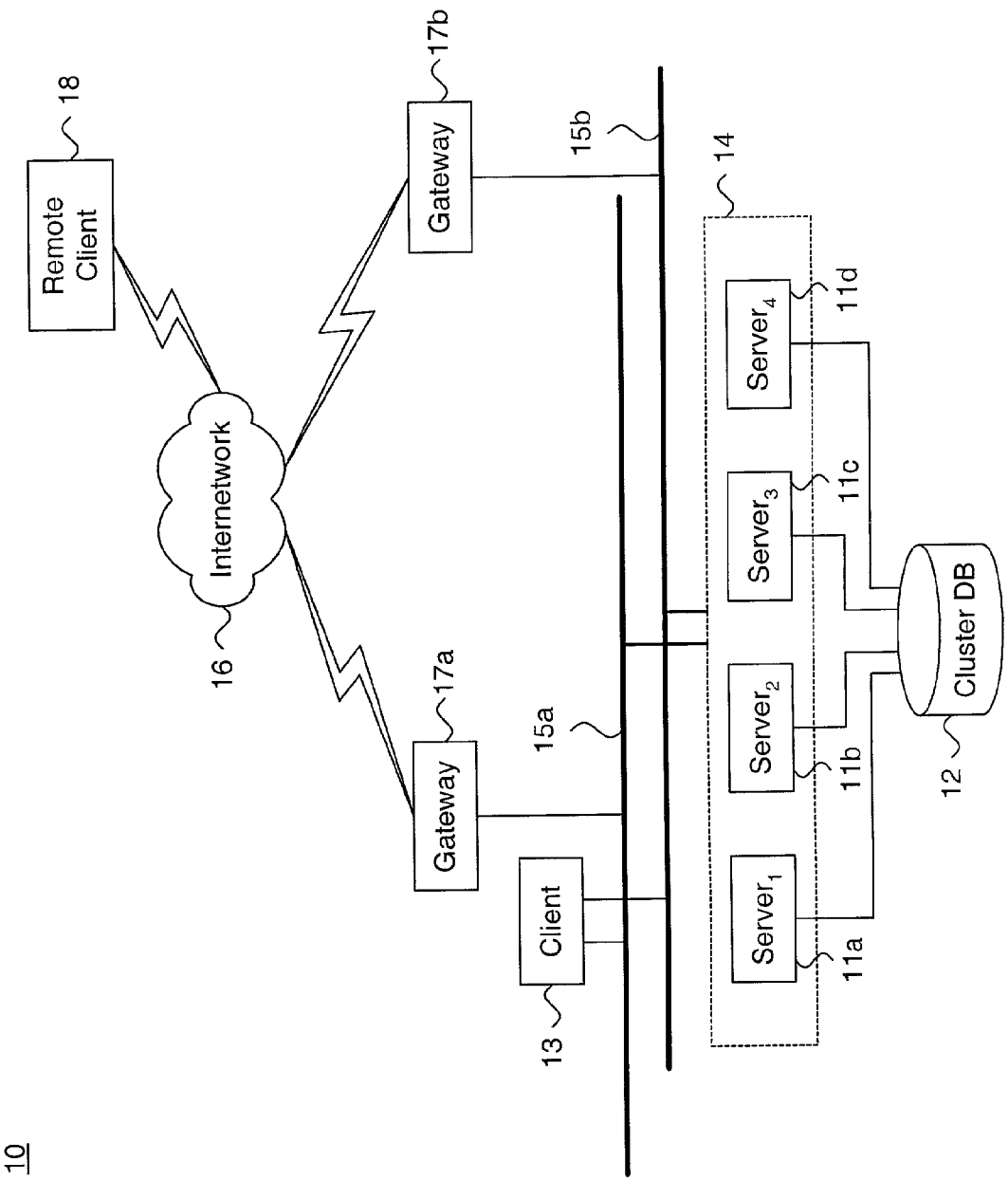
FIG. 1 is block diagram showing a cluster computing environment including cluster databases incorporating high availability components.

A method and apparatus for providing an out-of-band notification for a service change is described. In the following description, for the purposes of explanation, numerous specific details are set forth to provide a thorough understanding of the present invention. One skilled in the art would recognize that the present invention may be practiced without these specific details. In other instances, well-known structures and devices are shown in block diagram form to avoid unnecessarily obscuring the present invention.

FUNCTIONAL OVERVIEW

In one embodiment, a mechanism is disclosed that provides for out-of-band notifications of database service changes in a cluster framework of cooperative resource groups. The use of an out-of-band notification can resolve situations in which clients block on read or write responses upon a node failure with the sockets remaining open.

An embodiment of the present invention is a system and method for providing out-of-band notification of database service changes. A cluster framework is structured into a layered architecture. An application layer includes at least one of applications and middleware supporting the applications. A database instance resource group interoperates with the application layer and includes a database instance providing services. A monitor is associated with the database instance resource group and exports an out-of-band interface to the clients. An UP service notification is generated from the cluster framework upon service availability. A DOWN service notification is generated from the cluster framework upon service non-availability.

A further embodiment is a system and method for communicating service change events in a cluster framework environment. A plurality of service change events for communication between a plurality of nodes are defined and include an UP service change event, a DOWN service change event, a COMING UP service change event, and a GOING DOWN service change event. The event is published to subscribing clients and the middleware layer.

Table 2 describes the effects of service outages on a TCP/IP-based client in an environment including cooperative resource groups and out-of-band service change notifications in accordance with the present invention. In the first case, an outage with sockets closed due to software failure or node shutdown, the client receives an error, plus an out-of-band event (service change notification) for a conversation or blocked I/O, and recovers. In the second case, an outage with sockets left open, the client receives either an error or an out-of-band event, thereby enabling the client to immediately recover. This arrangement eliminates TCP/IP timeout errors for active connections with active conversations.

TABLE 2

Client Effects.

| State of Sockets After Outage | Connection Request | Conversation (SQL or PL/SQL Request) | Blocked in I/O Read or Write |
|---|---|---|---|
| Socket Closed (software failure or node shutdown) | Client receives error | Client receives both error and out-of-band event | Client receives both error and out-of-band event |
| Socket left open (node panics) | Client receives error due to logical IP address failing over | Client receives out-of-band event | Client receives out-of-band event |

FIG. 1 is a block diagram showing a cluster database 12 incorporating high availability components. Parallel database servers 11a–d, each including a cooperative resource group are each coupled to a single cluster database 12 to form a high availability cluster framework 14, such as described in U.S. patent application, Ser. No. 10/086,782 entitled "System And Method For Providing Cooperative Resource Groups For High Availability Applications," filed Feb. 28, 2002, pending, the disclosure of which is incorporated by reference in its entirety for all purposes. The servers 11 process a stream of transactions received from clients, such as client 13 and remote client 18, in parallel with each server processing an entire transaction.

Operationally, the remote client 18 is interconnected to the servers 11a–d via an internetwork 16, such as the Internet. Servers 11a–d and client 13 are interconnected via intranetworks 15a, 15b. Both intranetworks 15a and 15b are respectively interconnected to the internetwork 16 through gateways 17a–b. Other network topologies and configurations, including various combinations of intranetworks and internetworks are feasible, as would be recognized by one skilled in the art.

The cluster framework 14 appears as a single node to individual clients, which subscribe to the services published by each cluster. The client sessions receive notification of any changes in the services provided and transfer to alternate nodes as necessary, as further described below beginning with reference to FIG. 2.

Within each cluster framework 14, each of the database servers 11 incorporate high availability components, such as described in J. Gray et al., "Transaction Processing: Concepts and Techniques," pp. 128–38, M. Kaufmann Pubs., San Francisco, Calif. (1993), the disclosure of which is incorporated by reference in its entirety for all purposes. Failover processing is initiated upon the detection of the termination of a database instance, such as described in U.S. patent application, Ser. No. 10/087,494, entitled "System And Method For Detecting Termination Of an Application Instance Using Locks," filed Feb. 28, 2002, pending, the disclosure of which is incorporated by reference in its entirety for all purposes. Likewise, upon a planned shutdown, an application will switch over to another instance of the database supporting the service. Other situations in which failover processing is required are possible, as would be recognized by one skilled in the art.

The response times provided by the substitute database servers 12 in the standby node may be longer than prior to failover or switchover until the ramp-up period for populating the database instance caches has run, although the ramp-up period can be substantially minimized by pre-connecting to the standby node and warming the database instance caches beforehand, such as described in U.S. patent application, Ser. No. 10/086,842 entitled "System And Method For Pre-Compiling A Source Cursor Into A Target Library Cache," filed Feb. 28, 2002, pending, the disclosure of which is incorporated by reference in its entirety for all purposes.

The individual computer systems, including database servers 11, clients 13, and remote clients 18, are general purpose, programmed digital computing devices consisting of a central processing unit (CPU), random access memory (RAM), non-volatile secondary storage, such as a hard drive or CD-ROM drive, network interfaces, and peripheral devices, including user-interfacing means, such as a keyboard and display. Program code, including software programs, and data are loaded into the RAM for execution and processing by the CPU and results are generated for display, output, transmittal, or storage.

Figure 2:
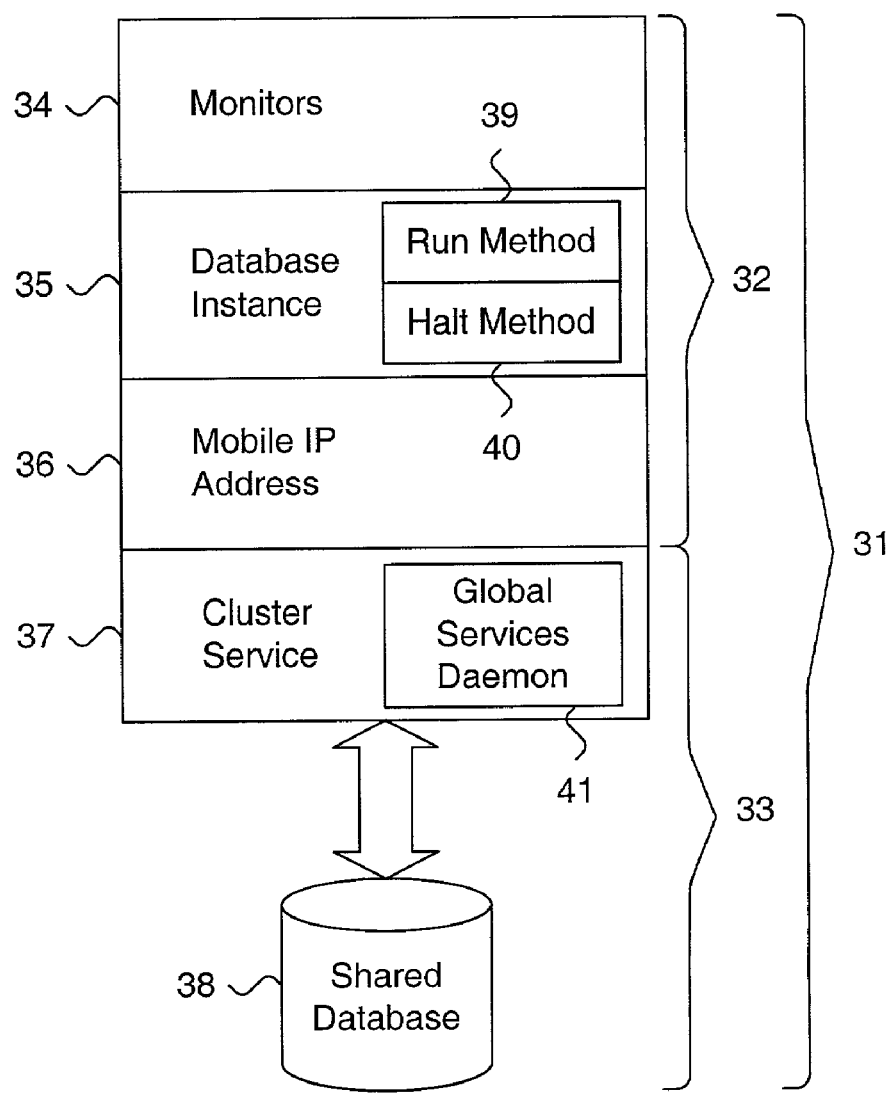
FIG. 2 is a functional block diagram showing a database stack implemented on a server node, including a system for providing out-of-band notification of service changes, in accordance with the present invention.

FIG. 2 is a functional block diagram showing a database stack 31 implemented on a server node 30, including a system for detecting termination of a database instance using locks, such as described in U.S. patent application, Ser. No. 10/087,494, entitled "System And Method For Detecting Termination Of an Application Instance Using Locks," filed Feb. 28, 2002, pending, the disclosure of which is incorporated by reference in its entirety for all purposes. The database stack 31 is logically divided into two parts: a cooperative resource group 32, and a resource 33. The cooperative resource group 32 includes a mobile internet protocol (IP) address 36, a database instance 35 (or high availability application), and external monitors 34. The mobile IP address 36 is assigned to the cooperative resource group 32 to support client access. More generally, a generic high availability application could execute within the cooperative resource group 32, instead of the database instance 35, as would be recognized by one skilled in the art.

The monitors 34 detect the failure of the database instance 35 or the loss of access to a resource 33, plus "hang" situations. The resources 33 include a cluster service 37 and a shared database 38, as well as physical hardware devices, such as disk drives and network cards, and logical items, such as volume groups, TCP/IP addresses, applications, and database instances.

Within each cluster framework 14 (shown in FIG. 1), the cluster service 37 executes all operations on the cooperative resource group 32. Three types of out-of-band notifications of service changes are provided. Notifications are provided as part of running and halting the cooperative resource group 32 supporting a database instance using run method 39 and halt method 40, as further described below with reference to FIG. 4. Notifications are also provided as part of planned operations on the cooperative resource group 32 using a flexible user interface (not shown) implemented in an applications and middleware layer, as further described below with reference to FIG. 5. Finally, notifications are provided as part of membership change events using a global services daemon 41 implemented as part of the cluster service 38, as further described below with reference to FIG. 6.

As shown below in Table 3, each service notification includes seven parameters naming the application service that is changed, and describing the role of the service, node name, new status and date and time stamp of the change.

TABLE 3

| Parameter | Description |
| --- | --- |
| Service Name | Name of application service that has changed |
| Role of Service | Role of the service - primary, secondary or off-line (maintenance) |
| Node Name | Node name where cooperative resource group is on-line |
| Database Name | Name of the database |
| Instance Name | Name of the instance |
| Status | New status that service has assumed or is about to assume. Values are UP, DOWN, COMING_UP, and GOING_DOWN |
| Incarnation | Date and timestamp (local time zone) to order notification messages |

Each module within the database stack 31 is a computer program, procedure or module written as source code in a conventional programming language, such as the C++ programming language, and is presented for execution by the CPU as object or byte code, as is known in the art. The various implementations of the source code and object and byte codes can be held on a computer-readable storage medium or embodied on a transmission medium in a carrier wave. The run method 39, halt method 40, and global services daemon 41 operate in accordance with a sequence of process steps, as further described below beginning with reference to FIGS. 4, 5 and 6.

Figure 3:
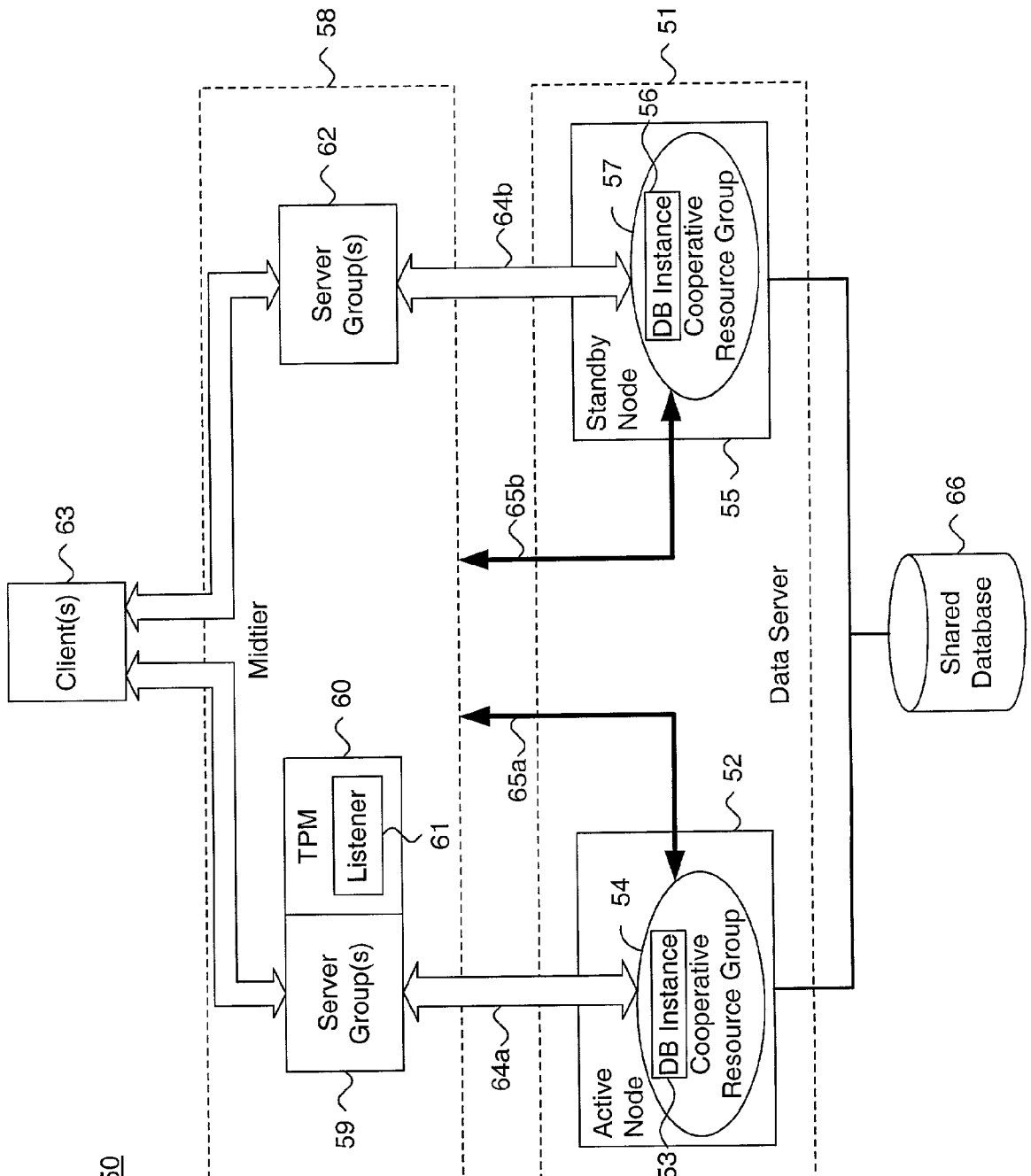
FIG. 3 is a functional block diagram showing, by way of example, an active and stand-by node configuration, including a midtier.

FIG. 3 is a functional block diagram showing, by way of example, an active and standby node configuration 50, including a midtier. In this example, a data server tier 51 includes an active node 52 and standby node 55 executing against a shared database 66. The active node 52 includes an active database instance 53 executing within a cooperative resource group 54 while the standby node 55 includes a standby database instance 56 executing within a standby cooperative resource group 57. There can be multiple active and multiple standby nodes. In this example, a client/middleware tier (midtier) 58 includes two sets of server groups 59, 62. The server group 59 includes an associated transaction process monitor (TPM) 60.

The described configuration applies equally to two- or three-tiered database models, and also applies equally to fully active database nodes, as would be recognized by one skilled in the art. In a two-tiered database model, the client/middleware tier 58 includes clients. In a three-tiered database model, the client/middleware tier 58 interfaces to one or more clients 63 executing in an upper client tier.

The database instances 53, 56, communicate through mobile internet protocol (IP) addresses 65a–b. Change of service notifications 64a–b are exchanged separately from communications between the database instances 53, 56 through asynchronous remote procedure calls (RPCs) or preferably by using an event system on redundant public networks.

In addition to the active node 52 and standby node 55 in the data server tier 51, two sets of server groups 59, 62 execute in a client/middleware tier 58. Each set can comprise multiple server groups. In the described configuration, one database instance 53 and one set of server groups 59 are active while the other database instance 56 and set of server groups 62 are in standby, ready to take over in the event of a failure. A key aspect of this example configuration is an option for the standby server groups 62 to be pre-connected, that is, connected and ready to resume service immediately upon notification of a failure.

For example, assume that the active database instance 53 fails while sessions executing within the set of active server groups 59 are active or blocked during read or write system calls. Next, the active node 52 fails. Membership changes and the services formerly provided by the now-failed database instance 53 are moved to the standby node 55. A global services daemon 41 (shown in FIG. 2) receives notification of a COMING UP event (described below). A listener 61 executing within a TPM 60 receives the service change notification, stops the failed server group 59, and resumes services on the standby server node 55. Application logic within the TPM 60 resubmits any failed transactions and recovers any in-doubt transactions. Transaction processing then continues as normal.

Event-based or RPC change of service notifications are issued for three different work flows for cooperative given resource groups as follows:

(1) by the cluster service 37 as part of running and halting a cooperative resource group 32 supporting a database instance 35 (shown in FIG. 2);
(2) by the user interface routine as part of a planned action requested for the cooperative resource group 32; and
(3) by a global services daemon 41 internal to the resource 33 that is waiting on a service change event at a recovering database instance 35.

The use of an out-of-band event resolves situations in which clients block on read or write responses upon a node failure with the sockets remaining open.

Figure 4:
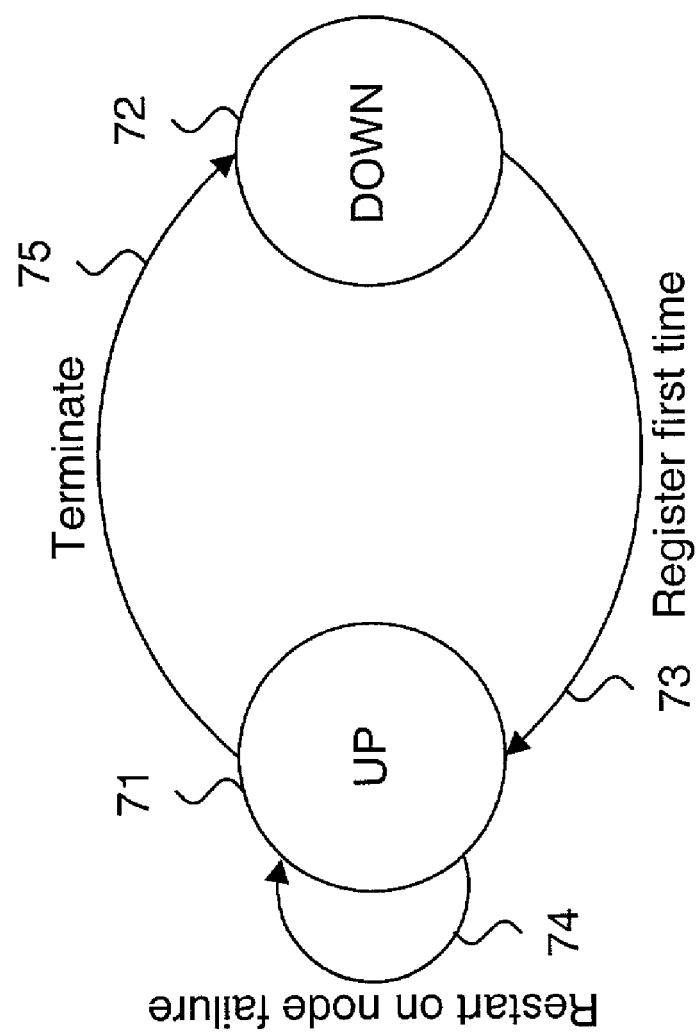
FIG. 4 is a state transition diagram showing service change notifications for a cluster service.

FIG. 4 is a state transition diagram 70 showing service change notifications for a cluster service 37. Server change notifications for cluster services are generated as part of the running and halting of a cooperative resource group 54 supporting a database instance 35.

Planned service changes are communicated using the notification mechanism in the run method 39 and halt method 40 in the database instance 35 using either an event-based or RPC mechanism. Depending upon the mechanism used, either an event or an RPC is issued synchronously to allow the database instances 35 receiving the change of service notifications to methodically execute steps before the cluster service 37 continues with shutdown. For example, a client database instance 35 is able to shut down before a subscribed server database instance is terminated. When executed as an event or an RPC, a reliable handshake is used to ensure that the call is received.

Notifications are sent to inform client sessions that the cluster service 37 is in one of two states, either UP 71 or DOWN 72. A notification that the service is in an UP state 71 is made when the application service is registered to a listener 61 (shown in FIG. 3) for the first time (transition 73). Notification that the service is in a DOWN state 72 is sent after the application service is terminated (transition 75). The transitions to the UP state 71 are implemented as part of the starting of a cooperative resource group 54. The transition to the DOWN state notification is implemented as part of halting a cooperative resource group 54.

No DOWN state notification is sent if a node fails without executing the halt method for the cooperative resource group 54. When a node fails without executing the halt method, node failure is inferred when a COMING_UP state 91 (shown in FIG. 6) is received from the cooperative resource group 32 at the recovering node while the node restarts on failure (transition 74). The DOWN state notification is sent for each group membership change on the other nodes.

Figure 5:
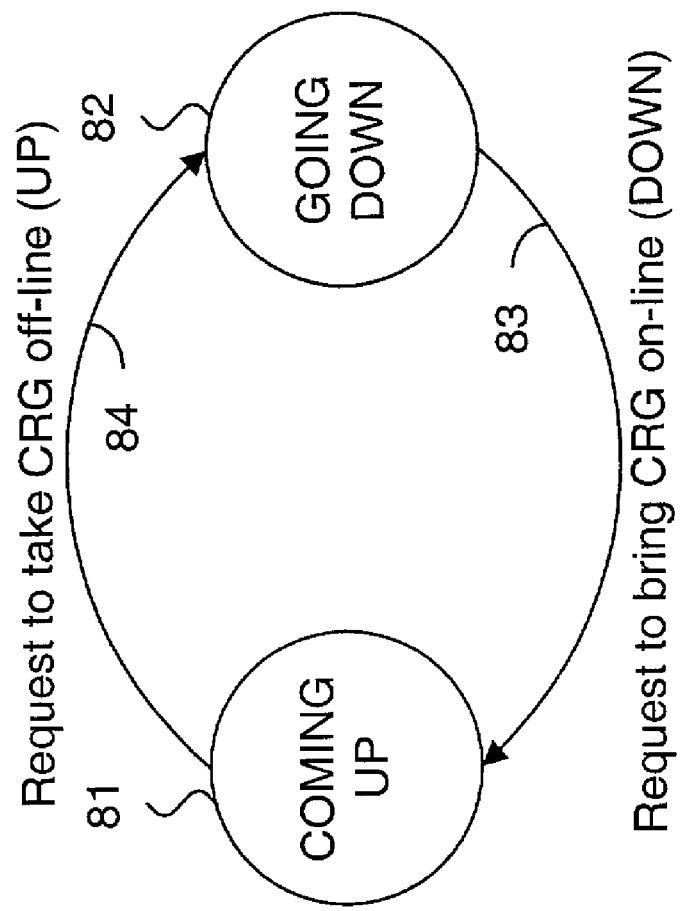
FIG. 5 is a state transition diagram showing notifications as part of a user interface routine.

FIG. 5 is a state transition diagram 80 showing notifications as part of a user interface routine, which allows user defined control over failover, switchover, and related operations, such as creating a record of uptime and opening fault-tracking tickets.

Notification that the service is in a COMING_UP state 81 is made when a request is issued to bring the cooperative resource group 32 (shown in FIG. 3) on-line (DOWN) (transition 83). The COMING_UP state notification is implemented as part of the user interface and occurs when a request is issued to the cluster service 37 to bring the cooperative resource group 32 containing the database instance 35 on-line.

Notification that the service is in a GOING_DOWN state 82 is made when a request is issued to take the cooperative resource group 32 off-line (UP) (transition 84). The GOING_DOWN state notification is implemented as part of the planned operation interface that occurs when a request is issued generally via the user interface to the cluster service 37 to take the cooperative resource group 32 off-line.

Figure 6:
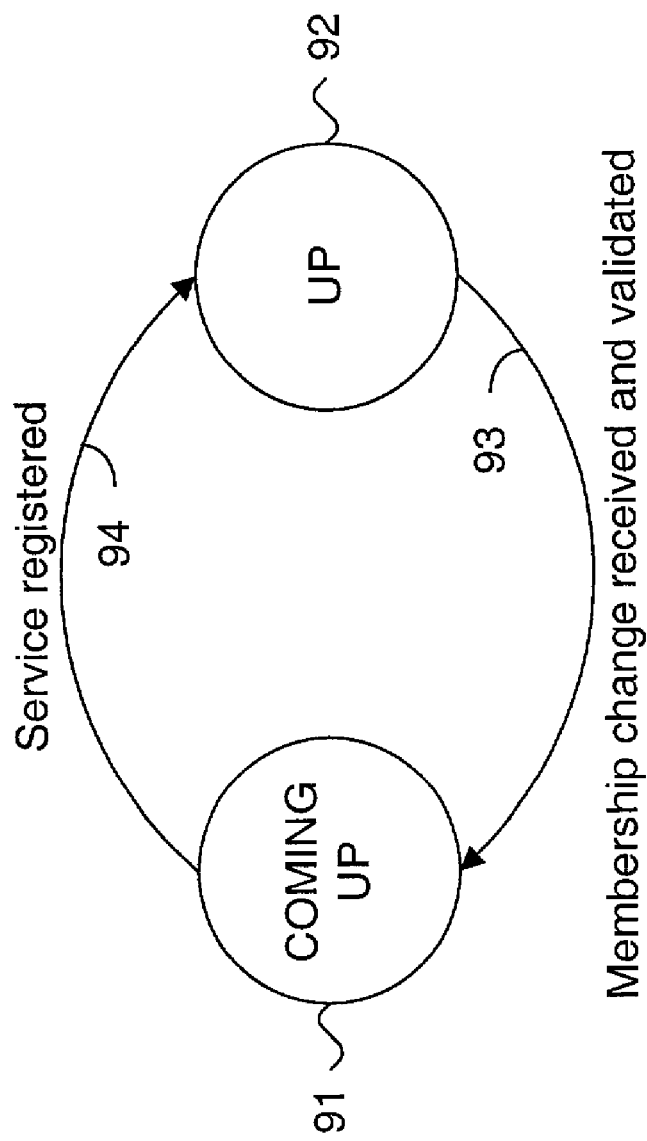
FIG. 6 is a state transition diagram showing notifications as part of a global services daemon.

FIG. 6 is a state transition diagram 90 showing notifications as part of a global services daemon 41 (shown in FIG. 2). Notification is provided as part of a membership change event. Notification that the service is in a COMING_UP state 91 is made on a recovering database instance 35 (shown in FIG. 2) immediately following the receipt and validation of a membership change event (transition 93). The COMING_UP state notification is implemented using a global services daemon 41 started with the cooperative resource group 32. This transition waits on and validates the membership change event. Note that for a two-node cluster with one node acting as a primary and the other node acting as a secondary, this transition occurs on the secondary node when the primary node terminates. For a fully active cluster with more than two nodes, this notification occurs at the first node that detects the membership change.

A notification that a service is in an UP 92 state is made when the service is registered and the role becomes available (transition 94). The UP state notification 92 is implemented using the same global services daemon 41 that waits for a membership change event. Switching of services and roles occurs before Distributed Lock Manager (DLM) locks are re-mastered. For a fully active cluster with more than two nodes, switching of services and roles is performed by the global services daemon 41 and not necessarily at the recovering database instance 35.

Figure 7:
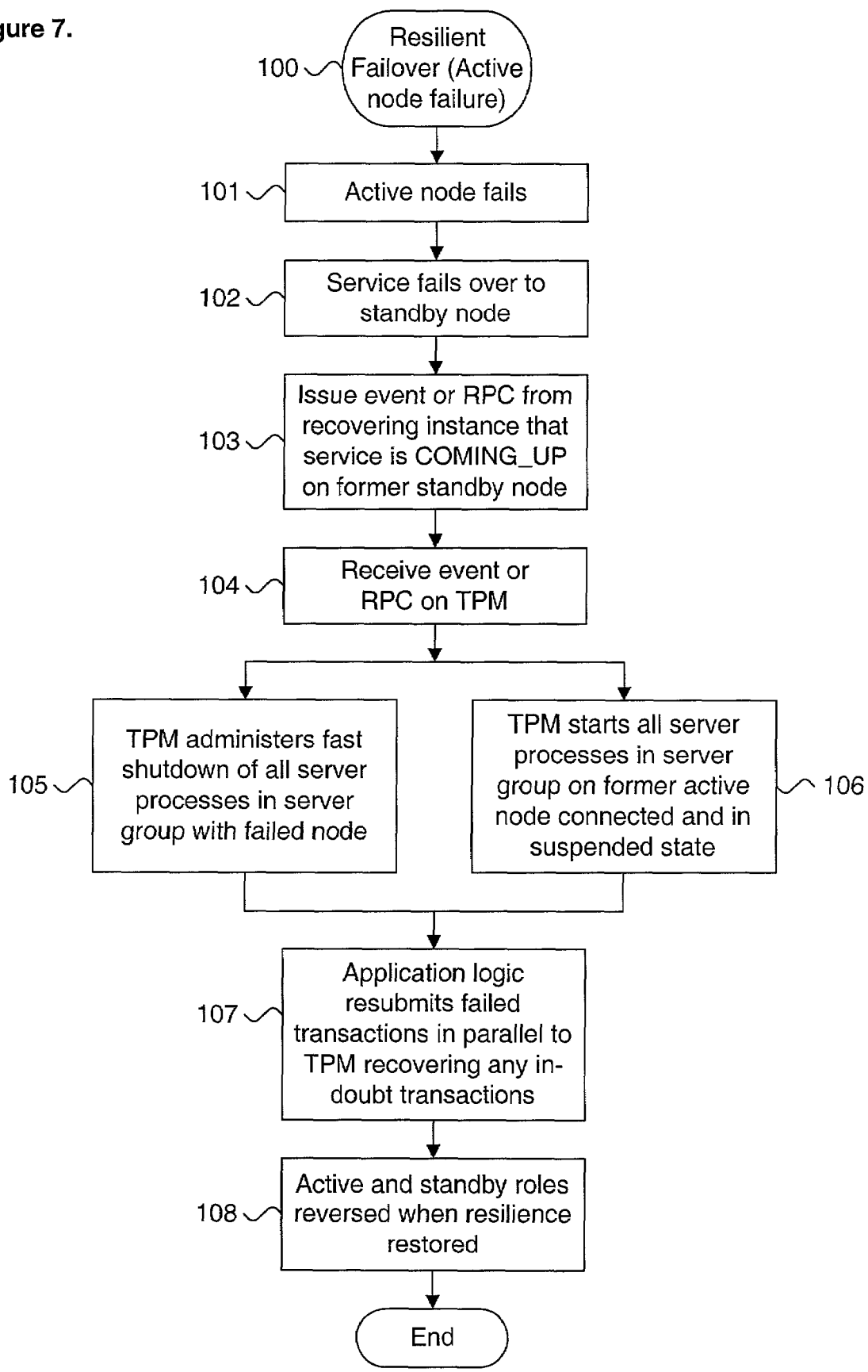
FIG. 7 is a flow diagram showing, by way of example, a method for providing resilient failover upon an active node failure.

FIG. 7 is a flow diagram showing, by way of example, a method for providing resilient failover upon an active node failure 100. The purpose of this routine is to provide service failover to a standby node (block 102) following the failure of an active node (block 101). Depending upon the mechanism used, either an event or an RPC is issued from the recovering instance that the service is in a COMING_UP state 81 (shown in FIG. 5) on the node that was previously executing as a standby node (block 103).

By way of example, high availability logic executing within a TPM that subscribes to the resource manager state events receives the COMING_UP state notification (block 104) as either an event or an RPC. Upon receiving the COMING_UP state 81 notification, a two-step process (blocks 105–106) occurs in parallel. First, the high availability logic in the TPM administers, via an administration utility, a fast shutdown of all server processes in the server group executing on the failed node (block 105). Concurrently, the high availability logic starts all server processes in the server group on the former active node connected and in a suspended state (block 106). The former active node is pre-connected. The high availability logic then resubmits any failed transactions in parallel while the TPM recovers any in-doubt transactions (block 107). When resilient operation is restored, the active and standby roles are reversed (block 108), whereupon the method completes.

Figure 8:
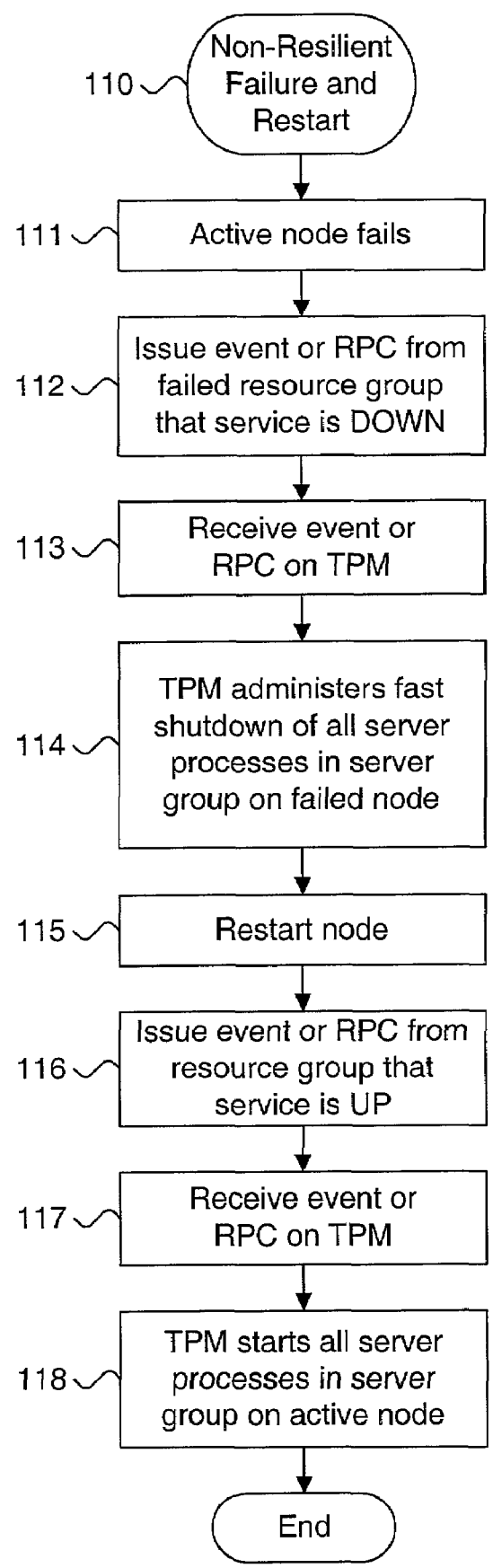
FIG. 8 is a flow diagram showing, by way of example, non-resilient failure and restart.

FIG. 8 is a flow diagram showing, by way of example, non-resilient failure and restart 110. For a non-resilient configuration, that is, a one node configuration, the node must be restarted upon a failure, as there is no standby system ready to take over processing in the event of a failover.

Thus, upon the failure of the active node (block 111), depending upon the mechanism used, either an event or an RPC is issued from the failed cooperative resource group 32 that the service is in a DOWN state 72 (block 112). The high availability logic in the TPM (midtier or client) that subscribes to the resource manager state events receives the notification about the change in service (block 113) as either an event or an RPC. The TPM (midtier or client) administers a fast shutdown of all server processes associated with the failed resource manager instance (block 114) and restarts the failed node (block 115). Upon successful restart, an event or an RPC is issued in all places from the recovered cooperative resource group 32 that the service is in an UP state 71 (block 116). The TPM (midtier or client) subscribing to the resource manager state events receives the UP service change notification (block 117) as either an event or an RPC. The TPM (midtier or client) resumes from a suspended state the server processes in server group on the active node (block 118), after which the routine completes.

Figure 9:
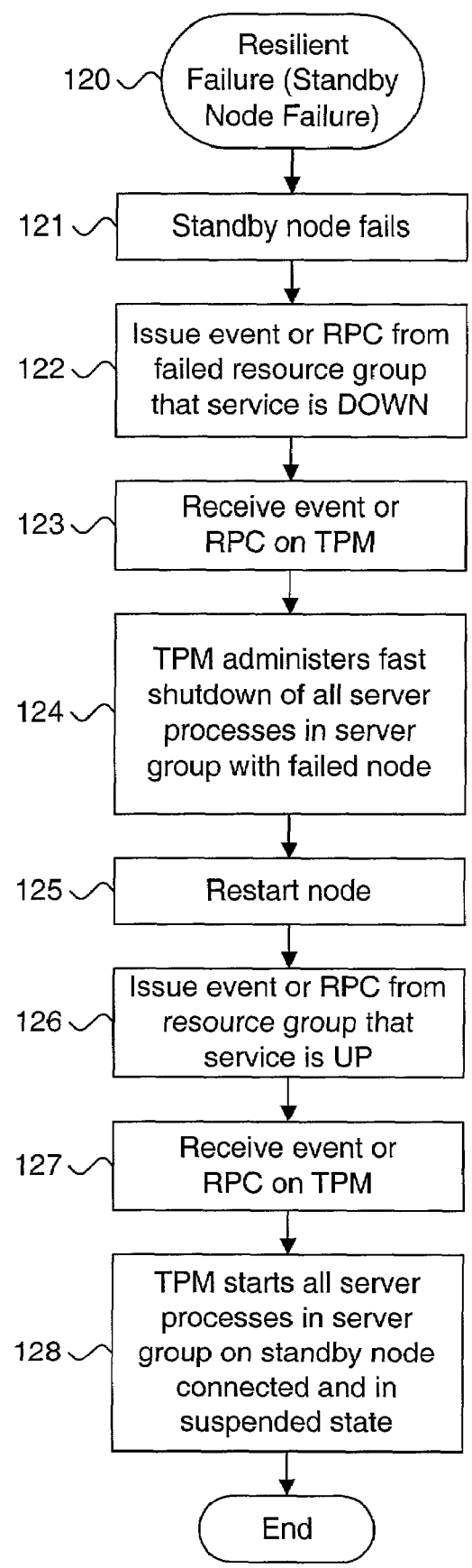
FIG. 9 is a flow diagram showing, by way of example, resilient failover following failure of a standby node.

FIG. 9 is a flow diagram showing, by way of example, resilient failover following failure of a standby node 120. The standby node simply must be restarted upon a failure.

Thus, upon the failure of the active node (block 121), depending upon the mechanism used, either an event or an RPC is issued from the failed cooperative resource group 32 that the service is in a DOWN state 72 (block 122). In this example, the high availability logic in the TPM (midtier or client) that subscribes to the resource manager state events receives the notification about the change in service (block 123) as either an event or an RPC. The TPM (midtier or client) administers a fast shutdown of all server processes associated with the failed resource manager instance (block 124) and restarts the failed node (block 125). Upon successful restart, an event or an RPC is issued from the recovered cooperative resource group 32 that the service is in an UP state 71 (block 126). The TPM (midtier or client) subscribing to the resource manager state events receives the UP service change notification (block 127) as either an event or an RPC. The TPM (midtier or client) starts all the server processes on the standby node with the node pre-connected, that is, connected and in a suspended state (block 128), after which the routine completes.

Figure 10:
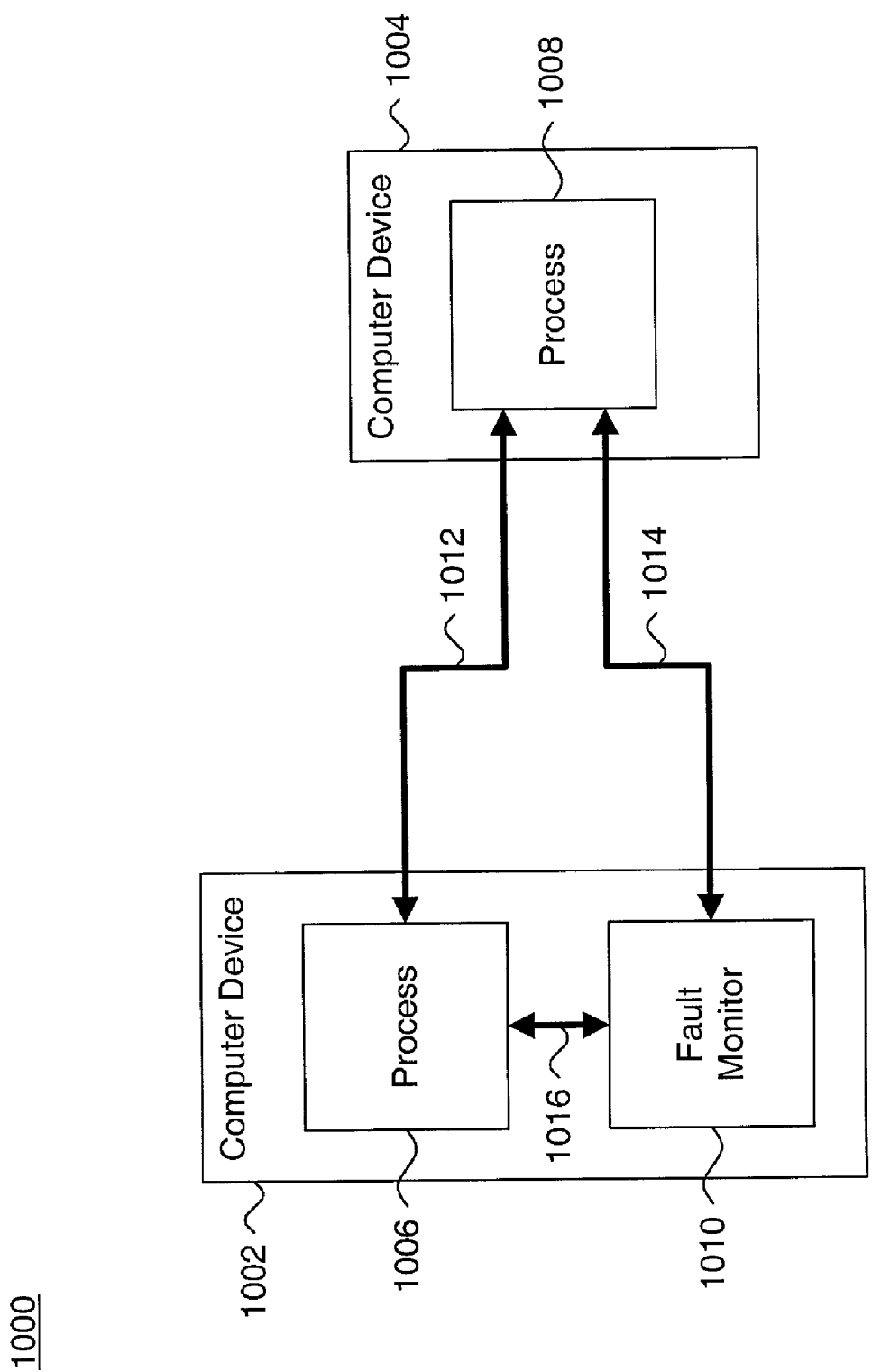
FIG. 10 is a block diagram in accordance with certain embodiments of the invention.

In certain embodiments, a monitoring process is used to monitor the status of a particular process. If the monitoring process determines that the specific process has failed, the monitoring process can proceed to take certain actions to notify other processes that the specific process has failed. For example, FIG. 10 is a block diagram 1000 showing a communication link 1012 that has been established between a computer device 1002 and a computer device 1004. In this example, a communication link 1012 can be established using various different communication protocols or by a variety of different communication mediums. For example, communication link 1012 can be established using a variety of different network mediums, such as Ethernet, optical mediums, telephone lines, and so forth, that can include public networks, such as the Internet or one or more private networks, such as a company's private intranet.

In one embodiment, the communication link 1012 represents a socket connection that has been established using the TCP/IP protocols. Fault monitor 1016 represents a process or program that is configured to monitor the status of process 1006. As depicted in this example, a communication link 1016 is used by fault monitor 1010 to monitor the status of process 1006. A variety of methods can be employed to monitor the status of process 1006 and, as such, embodiments of the invention are not limited to any particular monitoring method. For example, the monitoring methods can include, but are not limited to "pinging" or verifying the "heartbeat" of process 1006 to determine whether process 1006 has failed. Other monitoring methods can include establishing one or more callbacks within process 1006 that notify fault monitor 1010 when an error is detected. In addition, although fault monitor 1010 is depicted as being located within computer device 1002, in certain embodiments, fault monitor 1010 can be located on a separate computer device from computer device 1002.

In one embodiment, upon detecting a failure of process 1006, fault monitor 1010 causes process 1008 to be notified that process 1006 has failed. In certain embodiments, fault monitor 1010 communicates the failure of process 1006 to process 1008 over a communication link 1014. Upon receiving the notification, process 1008 can then take appropriate actions based on the failure of process 1006.

For example, to allow process 1008 and process 1006 to communicate, a communication link 1012 can be established using a socket connection. As indicated above, in certain situations, if process 1006 fails after establishing communication link 1012, sockets can still remain open, thus causing a significant delay between the time that process 1006 fails and the time when process 1008 is able to detect the failure. In one embodiment, in response to detecting the failure of process 1006, fault monitor 1010 causes process 1008 to be notified that process 1006 has failed.

In certain embodiments, process 1008 is notified using an out-of-band break. For example, by communicating with process 1008 over a communication link that is separate from communication link 1014, an out-of-band break can be used to interrupt process 1008 and thus reduce the delay incurred by process 1008 having to wait for a particular timeout due to the failure of process 1006.

Figure 11:
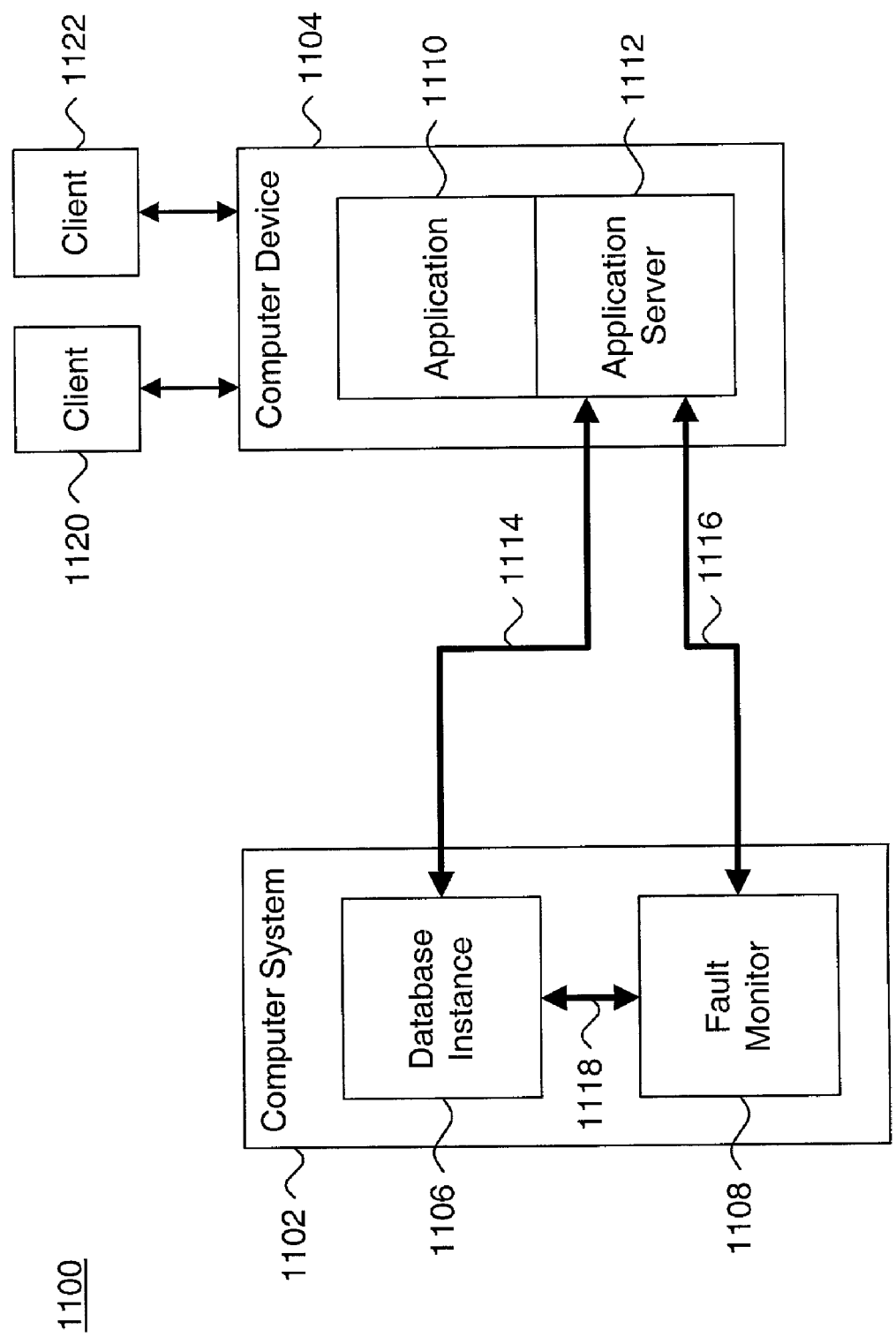
FIG. 11 is a block diagram in accordance with certain embodiments of the invention.

FIG. 11 is a block diagram 1100 in which certain embodiments of the invention can be used. In this example, computer system 1102 includes a database instance 1106 and a fault monitor 1108. Database instance 1106 is configured to execute database instructions that are received from computer system 1104. Fault monitor 1108 is configured to monitor the current status of database instance 1106. As further depicted, computer system 1104 includes an application server 1112 and one or more applications 1110. In certain embodiments, the one or more applications 1110 provide a set of services that can be utilized by one or more client devices 1120, 1122. For example, client devices 1120, 1122 can represent a set of one or more "thin" client devices that include a set of software programs, such as a browser application, that allows a user to access the services that are provided by the one or more applications 1110. To support execution of the applications, a communication link 1114 is established between the application server 1112 and the database instance 1106.

In one embodiment, upon detecting a failure of database instance 1106, fault monitor 1108 causes a notification to be sent to application server 1112, thus notifying application server 1112 that database instance 1106 has failed. Upon receiving the notification, application server 1112 can then take appropriate actions, which can include, for example, connecting to a different database instance.

In certain embodiments, prior to detecting a failure of database instance 1106, a communication link 1116 is established between fault monitor 1108 and application server 1112. Thereafter, upon detecting a failure of database instance 1106, fault monitor 1108 sends a message to application server 1112 over a communication link 1116 indicating that database instance 1106 has failed. In another embodiment, communication link 1116 is established after fault monitor 1108 detects that database instance 1106 has failed.

Figure 12:
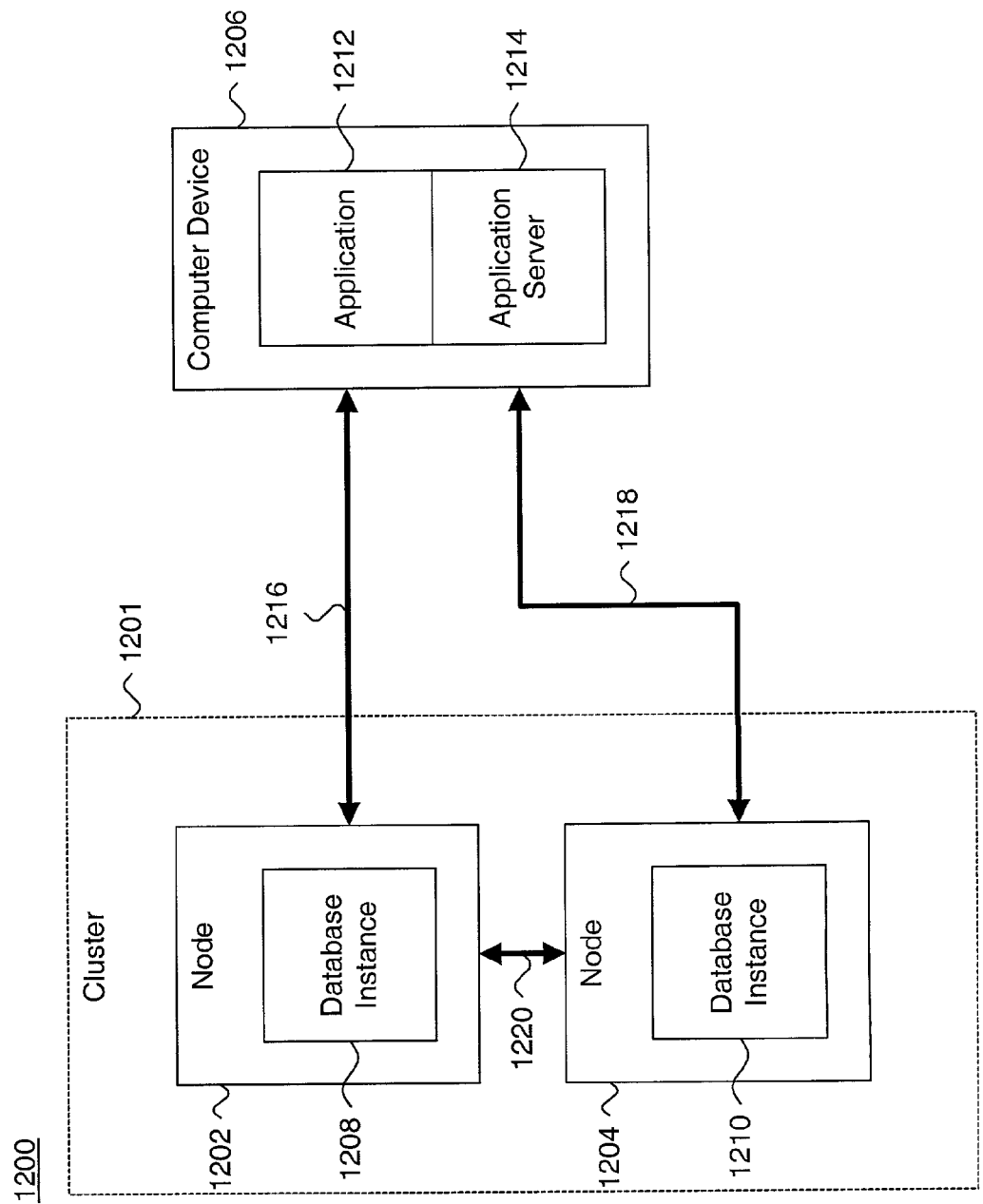
FIG. 12 is a block diagram in accordance with certain embodiments of the invention.

FIG. 12 is a block diagram 1200 in which certain embodiments of the invention can be used. As depicted, a plurality of nodes 1202, 1204 are configured as a cluster 1201. For example, nodes 1202 and 1204 can be configured as an Oracle Real Application Cluster™. In this example, node 1204 is configured to monitor the status of database instance 1208. In response to detecting that database instance 1208 has failed, node 1204 causes a notification to be sent to computer device 1206. Based on the notification, application server 1214 determines that database instance 1208 has failed and can proceed to take an appropriate action in response to the failure.

In one embodiment, instead of, or in addition to, notifying computer device 1206 of the failure of database instance 1208, node 1204 automatically updates the mobile IP address that is currently assigned to node 1202 to cause future communications to be automatically performed between application server 1214 and database instance 1210.

Figure 13:
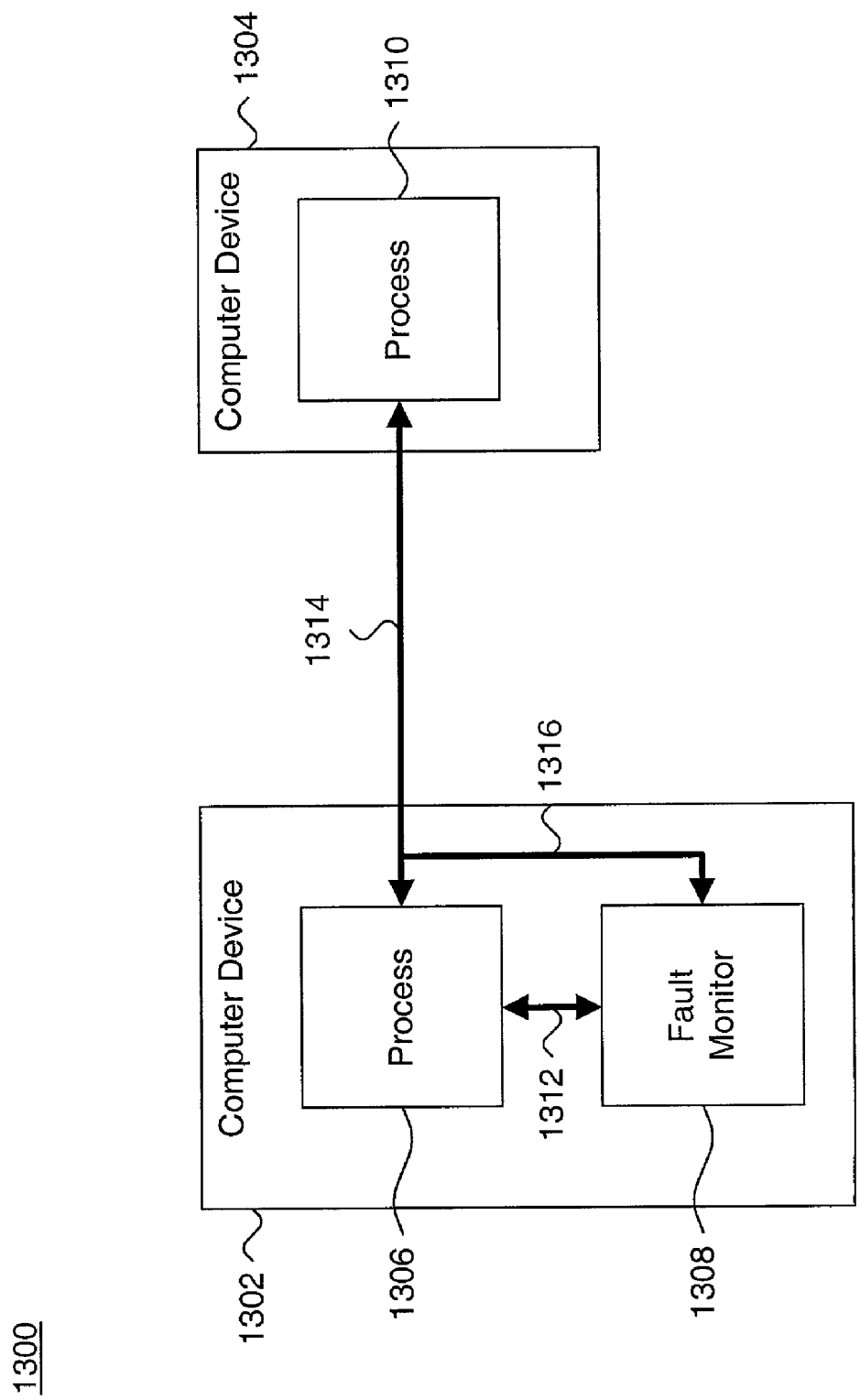
FIG. 13 is a block diagram in accordance with certain embodiments of the invention.

FIG. 13 is a block diagram 1300 in which certain embodiments of the invention can be used. In this example, a communication link 1314 has been established between a process 1310 executing on computer device 1304 and a process 1306 executing on computer device 1302. As depicted, fault monitor 1308 is configured to monitor the status of process 1306. In one embodiment, in response to detecting a failure of process 1306, fault monitor 1308 causes a fault notification to be sent to process 1310 over a communication link 1314.

For example, in response to detecting a failure of process 1306, fault monitor 1308 can cause a message to be sent over connection link 1314 that simulates as if the message was actually sent by process 1306 over the previously-established connection or session. For example, by replicating the header and other key information that is used to identify messages as being sent from process 1306, fault monitor 1308 can communicate with process 1310 over the communication link 1314. In response to receiving the message sent from fault monitor 1308 over the communication link 1314, process 1310 can initiate an appropriate action.

In another embodiment, in response to detecting a failure of process 1306, fault monitor 1308 causes the communication link 1314 to be closed. For example, if after the failure of process 1306, the socket connection is left open, by causing the socket connection to be closed, an error message can be detected by process 1310. Based on the error message, process 1310 can then take an appropriate action.

While the invention has been particularly shown and described as referenced to the embodiments thereof, those skilled in the art will understand that the foregoing and other changes in form and detail may be made therein without departing from the spirit and scope of the invention.

What is claimed is:

1. A system for providing out-of-band notification of service changes, comprising:
   a cluster framework into a layered architecture, comprising:
      an application layer comprising at least one of applications and middleware supporting the applications;
      a database instance resource group interoperating with the application layer and comprising a database instance providing services; and
      a monitor associated with the database instance resource group and exporting an out-of-band interface to the database instance resource group; and
   a notification mechanism generating an UP service notification from the cluster framework upon service availability and generating a DOWN service notification from the cluster framework upon service non-availability.

2. A system according to claim 1, further comprising:
   a planned operation interface incorporated into the application layer; and
   the notification mechanism generating a COMING UP service notification responsive to an instruction received through the planned operation interface and generating a GOING DOWN service notification responsive to a further instruction received through the planned operation interface.

3. A system according to claim 1, further comprising:
   a global services daemon interfaced to the database instance resource group; and
   the notification mechanism generating a DOWN service notification for the services on a failed database instance; generating a COMING UP service notification from the global services daemon responsive to a recovering database instance and generating an UP service notification from the global services daemon responsive to a recovered database instance.

4. A system according to claim 1, further comprising:
   at least one of a remote procedure call interface and an event interface provided to the database instance resource group.

5. A system according to claim 1, further comprising:
   a resilient set of cluster frameworks comprising an active node and one or more standby nodes.

6. A system according to claim 5, wherein the resilient cluster framework executes a node failover to the active node.

7. A system according to claim 5, wherein the resilient cluster framework executes a node failover to one such standby node.

8. A system according to claim 1, further comprising:
   a non-resilient set of cluster frameworks comprising an active node.

9. A system according to claim 1, wherein the resilient cluster framework terminates service on a failed node responsive to a DOWN service notification.

10. A system according to claim 1, wherein the resilient cluster framework resumes service on a recovered node responsive to an UP service notification.

11. A system according to claim 1, wherein the resilient cluster framework effects a switchover to a standby node responsive to a COMING UP service notification.

12. A system according to claim 1, wherein the application layer pre-connects to a standby node responsive to one of a COMING UP service notification and an UP service notification.

13. A computer-implemented method for providing out-of-band notification of service changes, comprising:
   configuring a cluster framework into a set of layers, wherein said set of layers compromise:
      an application layer comprising at least one of applications and middleware supporting the applications;
      a database instance resource group interoperating with the application layer and comprising a database instance providing services; and
      a monitor associated with the database instance resource group and exporting an out-of-band interface to the database instance resource group;
   generating an UP service notification from the cluster framework upon service availability; and
   generating a DOWN service notification from the cluster framework upon service non-availability.

14. A computer-implemented method according to claim 13, further comprising:
   incorporating a planned operation interface into the application layer;
   generating a COMING UP service notification responsive to an instruction received through the planned operation interface; and
   generating a GOING DOWN service notification responsive to a further 6 instruction received through the planned operation interface.

15. A computer-implemented method according to claim 13, further comprising:
   providing a global services daemon interfaced to the database instance resource group;
   generating a DOWN service notification for the services on a failed database instance;
   generating a COMING UP service notification from the global services daemon responsive to a recovering database instance; and
   generating an UP service notification from the global services daemon responsive to a recovered database instance.

16. A computer-implemented method according to claim 13, further comprising:
   providing at least one of a remote procedure call interface and an event interface to the database instance resource group.

17. A computer-implemented method according to claim 13, further comprising:
   configuring a resilient set of cluster frameworks comprising an active node and one or more standby nodes.

18. A computer-implemented method according to claim 17, further comprising:
   executing a node failover to the active node.

19. A computer-implemented method according to claim 17, further comprising:
   executing a node failover to one such standby node.

20. A computer-implemented method according to claim 13, further comprising:
   configuring a non-resilient set of cluster frameworks comprising an active node.

21. A computer-implemented method according to claim 13, further comprising:
   terminating service on a failed node responsive to a DOWN service notification.

22. A computer-implemented method according to claim 13, further comprising:
   resuming service on a recovered node responsive to an UP service notification.

23. A computer-implemented method according to claim 13, further comprising:
 effecting a switchover to a standby node responsive to a COMING UP service notification.

24. A computer-implemented method according to claim 13, further comprising:
 pre-connecting to a standby node responsive to one of a COMING UP service notification and an UP service notification.

25. A computer-readable storage medium holding instructions for causing a processor to execute the computer-implemented method according to claim 13.

26. A system for communicating service change events in a cluster 2 framework environment, comprising:
 a plurality of service change events for communication between a plurality of nodes, comprising:
  an UP service change event;
  a DOWN service change event;
  a COMING UP service change event; and
  a GOING DOWN service change event;
 a remote procedure call interface from a database instance in a database stack executing on one such node; and
 a notification mechanism publishing at least one such service change event from the database instance.

27. A system according to claim 26, further comprising: a further notification mechanism receiving the one such service change event at one or more other nodes.

28. A system according to claim 26, further comprising: a cluster service within the database stack.

29. A system according to claim 26, further comprising: a planned interface within the database stack.

30. A system according to claim 26, further comprising: a global services daemon with listener within the database stack.

31. A system according to claim 26, further comprising: a cluster service processing a multiple instance failover from the one such node to one or more other nodes.

32. A system according to claim 26, further comprising: a cluster service processing a single instance failover to the one such node.

33. A system according to claim 26, further comprising: a cluster service processing a switchover from the one such node to one or more other nodes.

34. A computer-implemented method for communicating service change events in a cluster framework environment, comprising:
 defining a plurality of service change events for communication between a plurality of nodes, comprising:
  an UP service change event;
  a DOWN service change event;
  a COMING UP service change event; and
  a GOING DOWN service change event;
 exporting a remote procedure call interface from a database instance in a database stack executing on one such node; and
 generating a notification publishing at least one such service change event from the database instance.

35. A computer-implemented method according to claim 34, further comprising:
 receiving the one such service change event at one or more other nodes.

36. A computer-implemented method according to claim 34, further comprising:
 providing a cluster service within the database stack.

37. A computer-implemented method according to claim 34, further comprising:
 providing a planned interface within the database stack.

38. A computer-implemented method according to claim 34, further comprising:
 providing a global services daemon with listener within the database stack.

39. A computer-implemented method according to claim 34, further comprising:
 processing a multiple instance failover from the one such node to one or more other nodes.

40. A computer-implemented method according to claim 34, further comprising:
 processing a single instance failover to the one such node.

41. A computer-implemented method according to claim 34, further comprising:
 processing a switchover from the one such node to one or more other nodes.

42. A computer-readable storage medium holding instructions for causing a processor to execute the computer-implemented method according to claim 34.

43. A computer-implemented method for detecting a failure of a first process, the method comprising the steps of:
 establishing a first connection between said first process and a second process;
 monitoring status of said first process to determine whether said first process has failed; and
 in response to determining that said first process has failed, notifying said second process that said first process has failed;
 wherein a second connection, that is different from said first connection, is used to notify said second process of said failure of said first process failure.

44. A computer-implemented method according to claim 43, wherein:
 the step of establishing a first connection between said first process and a second process includes the step of establishing a first connection between an application server and a database instance;
 the step of monitoring includes the step of monitoring status of said database instance; and
 the step of notifying said second process that said first process has failed includes the step of causing an out-of-band break to be sent to said application server.

* * * * *